United States Patent [19]

Campolo

[11] Patent Number: 5,283,429
[45] Date of Patent: Feb. 1, 1994

[54] FIBER OPTICAL MONITORING SYSTEM FOR ELETRICAL CONDUCTORS AND THE LIKE

[75] Inventor: Steve Campolo, Valley Stream, N.Y.

[73] Assignee: Leviton Manufacturing Co., Inc., Little Neck, N.Y.

[21] Appl. No.: 943,275

[22] Filed: Sep. 10, 1992

[51] Int. Cl.$^5$ .............................................. H01J 5/16
[52] U.S. Cl. ........................ 250/227.14; 250/227.15; 374/161
[58] Field of Search ................... 250/227.21, 227.16, 250/227.15, 227.17, 227.18, 227.19, 227.20, 227.14; 374/161, 162; 385/12, 13

[56] References Cited

U.S. PATENT DOCUMENTS

| | | |
|---|---|---|
| 3,609,731 | 9/1971 | Evans . |
| 3,625,589 | 12/1971 | Snitver . |
| 3,819,250 | 6/1974 | Kibler . |
| 4,151,747 | 5/1979 | Gottlieb et al. . |
| 4,203,326 | 5/1980 | Gottlieb et al. . |
| 4,278,349 | 7/1981 | Sander . |
| 4,403,143 | 9/1983 | Walker et al. ............... 250/227.15 |
| 5,026,141 | 6/1991 | Griffiths ....................... 250/227.15 |
| 5,182,779 | 1/1993 | D'Agostino et al. ............ 385/13 |

OTHER PUBLICATIONS

M. Gottlieb, G. B. Brandt and J. Butler "Measurement of Temperature with Optical Fibers", ISA Transactions, vol. 19, No. 4 (1980) pp. 55–63.

M. Gottlieb, and G. B. Brandt, "Measurement of Temperature With Optical Fibers Using Transmission Intensity Effects", Industrial and Scientific Conference Management, Inc. Report for EPRI Control No. RP. 970 (1979) pp. 31–37.

Wing F. Young and Alan R. Johnston, "Effect of Temperature on Optical Fiber Transmission, Applied Optics", vol. 17, No. 23, (Dec. 1978), pp. 3703–3705.

Primary Examiner—David C. Nelms
Assistant Examiner—Que T. Le
Attorney, Agent, or Firm—Paul J. Sutton

[57] ABSTRACT

An optical fiber sensing circuit can be used in a system to protect wires, cables and the like by sensing overtemperature and/or mechanical stress conditions in the wires, cables and the like. In one embodiment an optical fiber is placed in close proximity to the conductors running from the receptacle end to the plug end of an extension cord. The optical fiber has a core surrounded by a cladding, the core and cladding being constructed such that the difference between their respective indices of refraction varies with temperature, at least over a predetermined temperature range, and that the amount of light passing through the fiber varies with changes in this difference. Thus the transmission quality and quantity of light through the optical fiber are decreased when the fiber is heated or mechanically deformed. In the preferred embodiment, the received light is converted to an electrical signal and transferred to a signal level detector which provides an enabling output to a circuit interrupter when the electrical signal reaches a preset level. The circuit interrupter then operates to open circuit the conductors in the extension cord. In this embodiment a protective relay sensing element receives a signal directly from the element transducing the received light and, if the signal reaches a preset level, operates its movable contacts which function as a circuit interrupter to open circuit the conductors of the extension cord.

13 Claims, 1 Drawing Sheet

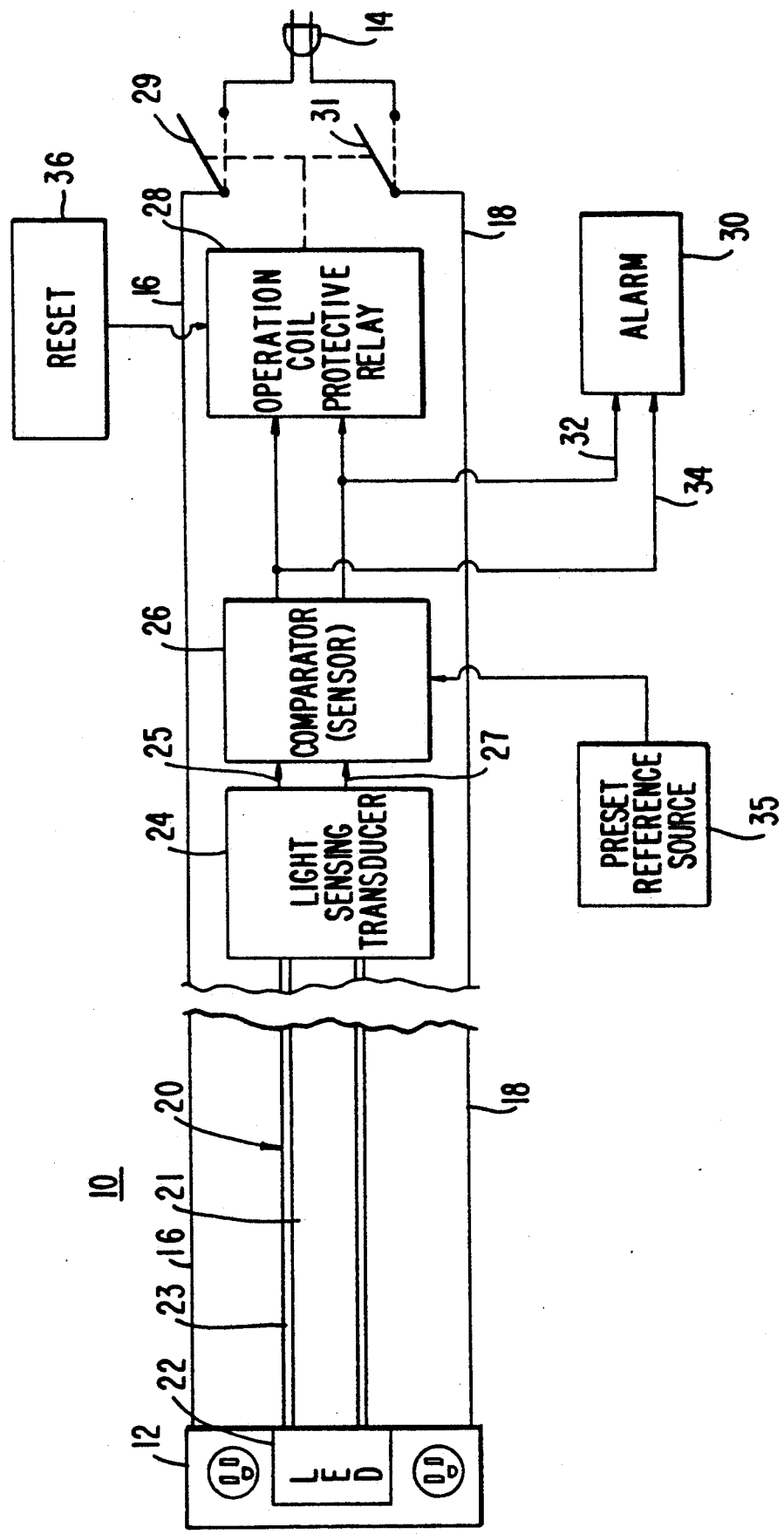

FIBER OPTICAL MONITORING SYSTEM FOR ELETRICAL CONDUCTORS AND THE LIKE

BACKGROUND OF THE INVENTION

This invention relates to an optical fiber monitoring system which can be used to protect wires, cables, and the like by sensing overtemperature and/or mechanical stress conditions of such wires, cables and the like.

It is known to use an optic fiber monitoring system with a transformer or generator to monitor the operating temperature thereof and using a light source, which can be for example, a light emitting diode, which transmits light through an optical fiber conductor which passes through the transformer or a generator enclosure to impinge on a phototransducer. The electrical output from the phototransducer can be passed through an amplifier to a processor and then used to initiate an alarm if the temperature in the enclosure is beyond prescribed levels. The optical fiber conductor comprises an optical fiber core with one or more cladding material layers surrounding the core, and a jacket surrounding the core and the cladding material. The core exhibits an evanescent field which extends through the cladding material into the jacket at a selected range of optical wavelengths. The cladding material having a thickness whereby light attenuation in the conductor below a first temperature range is less than light attenuation in the conductor above the first temperature range.

It is also known to use a temperature monitoring arrangement comprising a light source situated at one end of an optical fiber section, and a light detector situated at the opposite end of the optical fiber section. The optical fiber section passes through an area in which the temperature is to be monitored, for example, a generator, transformer, or the like. The type of optical fiber section used can comprise a core and a cladding extending concentrically around the core, with the core and cladding being constructed of material such that the difference between their respective indices of refraction varies with temperature, at least over a predetermined temperature range, and, consequently, the amount of light passing through the fiber varies with changes in the temperature so long as the index of refraction of the core is greater than that of the cladding. It is also known to use an optical fiber comprising a flexible curved section constructed such that the amount of light passing through the fiber along the flexible curve section varies with changes in the radius of curvature of the curved section. In this arrangement, the sensor also includes means for varying the radius of curvature in response to changes in the temperature being monitored or other such condition.

Also known is the system which recognizes the problem of the impossibility of distinguishing the change in light transmission along an optical fiber caused by temperature change from other attenuations which may occur if, for example, the fiber is bent. In this system, the apparatus comprises means for directing light having at least two different wavelengths through an optical fiber section to a sensor element composed of material which changes color in dependence on changes in temperature and means for detecting the reflected light therefrom after it is passed through an optical fiber and for generating signals from the reflected light, thus determining the temperature to which the sensor element is being subjected.

It is also known to use an apparatus comprising an optical fiber section through which a laser transmits coherent light, with means for applying light and/or pressure to the optical fiber section to change the characteristics of the coherent light as it is transmitted through the fiber section.

Also known is a system which discloses an optical fiber coupler having a core and a cladding, the respective indices of refraction of the core and cladding being substantially the same in value at a particular temperature but having different temperature sensitivities, and temperature control means disposed around the end of the optical fiber section where coupling is to take place for generating a variation in the difference in the indices of refraction of the core and cladding in the vicinity of this end by controlling the temperature of this end, the differences in the indices being substantially zero at this end and gradually increasing in a limited region of the guide away from the end, whereby coupling of light beams into and out of this end of the optical coupler is facilitated.

It is also known for publications to discuss in detail the mathematical basis for the measurement of temperature using optical fibers. Also known is a treatise which discusses the respective effects of transmitted power versus temperature, index of refraction versus temperature, and induced attenuation coefficients versus temperature for various fibers.

None of the aforementioned prior art references discloses an fiber optical monitoring system for electrical conductors or the like, such as is disclosed by the present invention which system comprises an electrical apparatus having a plurality of conductors, an optic fiber situated in such close proximity to the plurality of electrical conductors that the optical fiber is affected by temperature changes of the plurality of conductors and accordingly the amount of light passing through the optical fiber is altered, a light source at a first end of the optical fiber, means for detecting light and producing an electrical signal proportional to the detected light, being located at a second end of the optical fiber opposite the first end, and means responsive to the electrical signal to open the circuit the plurality of conductors are part of when the electrical signal reaches a preset level.

SUMMARY OF THE INVENTION

The present invention is based upon the principle that the transmission quality and quantity of light through an optical fiber is decreased when the fiber is heated or mechanically deformed. With respect to temperature, these conditions can be fulfilled by an optical fiber comprising a central core and a cladding extending concentrically around the core, the core and cladding being constructed such that the difference between their respective indices of refraction varies with temperature, at least over a predetermined temperature range, and that the amount of light passing through the fiber varies with changes in this difference, so long as the index of refraction of the core is greater than that of the cladding. If the index of refraction of the cladding is greater, no light at all will pass through the fiber. This light attenuation can be sensed electronically and the resultant electronic signal can be used to interrupt power to a wire or cable being monitored or to sound an alarm or perform any other function deemed necessary.

The use of an optical fiber for measurement is particularly advantageous in the presence of large electromagnetic field interference since this interference will not affect light transmission of the optical fiber, and in environments such as explosive atmospheres where sparks from electrical connections can be dangerous.

Typical applications of the fiber optical monitoring system for electrical conductors or the like of the instant invention include extension cords, building wiring, tray cables for storage batteries, power supply cords, transmission lines, power transformers, fluorescent ballasts, electrical blankets and heating pads, and pipe-heating cables.

In a preferred embodiment of the invention, an optical fiber is mounted adjacent to the power conductors within an extension cord. At the receptacle end of the extension cord, a light source such as a light emitting diode provides light which is transmitted along the optical fiber towards the plug end. In the plug end is mounted a light sensing means such as a photodiode or photo-transistor. The respective positions of the light source and the light sensing means can of course be reversed. The output of the light sensing means is coupled to a series connection of an electronic circuit and interrupter mechanism and/or to an alarm. The electronic circuit can comprise a voltage or current level sensor which, upon detection of a signal below a preset certain level, outputs a signal to operate the circuit interrupter mechanism. In the embodiment shown, the voltage or current level detector is a comparator circuit which receives the output signal of the light sensing means and compares it to a present reference level and if the output signal of the light sensing means falls below the preset reference level, the comparator circuit provides an output signal to the coil of a protective relay which operates its movable contacts from the closed position to the open position to interrupt the electrical conductor paths from receptacle to plug.

As the temperature of the electrical conductors rises, due to a short or high resistance contact in the circuit, etc. indices of refraction change and as the index of refraction of the cladding approaches that of the core the amount of light which the optical fiber can pass will decrease and thus permit the signal from the voltage or current level detector to fall below the preset reference level and thus operate the protective relay to open the electrical conductor circuits. The deformation of the optical fiber, as by a chair leg being placed upon it, also decreases the ability of the optical fiber to transmit light and also results in the operation of the protective relay to open the electrical conductor circuits. Likewise, if the cord is completely severed, no light will pass to the sensing end of the fiber and circuit interruption will also take place.

The invention also contemplates the use of other preferred embodiments comprising the use of other types of circuit interrupters besides a protective relay including those where a separately housed voltage or current sensor sends an enabling signal to a pair of switches connected in line with the respective power conductors or to a circuit breaker connected in line with the respective power conductors which provides an enabling signal for a circuit interrupter mechanism.

BRIEF DESCRIPTION OF THE DRAWING

The FIGURE is a schematic illustration of a temperature monitoring arrangement for an extension cord or the like constructed in accordance with a preferred embodiment of the present invention.

DETAILED DESCRIPTION OF THE INVENTION

The FIGURE shows an extension cord 10 having a receptacle end 12 and a plug end 14. Phase and neutral conductors 16 and 18, respectively extend the length of the extension cord 10. An over-temperature condition in conductors 16 and 18 could be generated by excess current therethrough, due, for example, to a short circuit or a high impedance contact, induction effects from coiling of the extension cord, or external temperature influences such as an increase in the ambient temperature.

An optical fiber 20 having a core 21 and a cladding 23 surrounding the core 21 is mounted within the extension cord 10 in close proximity to conductors 16 and 18. The material of the core 21, which may be glass or plastic, is selected so that its index of refraction is higher than the index of refraction of cladding 23, which may also be of glass or plastic. The indices of refraction of both the core 21 and cladding 23 change with increases of temperature, but some light will be passed along the optical fiber 20 as long as the index of refraction of the core 21 is greater than that of the cladding 23. All light transmission through the optical fiber 20 stops when the index of refraction of the cladding 23 is greater than that of the core 21. This phenomenon is explained in greater detail in U.S. Pat. No. 4,151,747 issued May 1, 1979 to which reference can be made.

At the receptacle end 12 of extension cord 10, a light source 22, which could be a light emitting diode (LED), transmits light along optical fiber 20 towards the plug end 14. In the plug end 14 is mounted a light sensing transducer 24 which could be a photodiode or phototransistor for converting the light received from the optical fiber 20 to an electrical output signal proportional to the amount of light received. The electrical output signal from the light sensing transducer 24 is fed via conductors 25, 27 to the sensor 26 which compares this signal to a preset reference level. As long as the signal from light sensing transducer 24 exceeds the preset reference level the electrical conductors 16,18 will be continuous from the receptacle end 12 to the plug end 14. When the present reference level exceeds the signal level from light sensing transducer 24, an operating signal is applied to the operating coil to a protective relay 28 which operates its normally closed contacts 29,31 (see dotted lines) to their open positions (see solid lines). The opening of contacts 29, 31 thus interrupts the conductor 16, 18 circuits and disrupts the flow of current through conductors 16, 18 from plug end 14 to receptacle end 12. In addition to operating the protective relay 28, operating signals are fed to alarm 30 via conductors 32, 24. The alarm may be a light, horn, whistle or any other device to advise that the circuit of conductors 16, 18 has been opened.

The protective relay 28 can alternatively be a solid state device which operates circuit paths rather than an electromechanical device as generally described above. Once the trouble has been cleared a reset signal can be applied by a momentary switch or the like 36 to the operating coil of the protective relay 28 to close contacts 29, 31 and permit current to flow from plug end 14 to receptacle end 12 again.

One form of electromechanical interrupting circuit is shown in FIG. 3 of U.S. Pat. No. 5,116,853 issued Nov.

24, 1992 on application Ser. No. 07/758,173 filed Sep. 11, 1991, and assigned to the assignee of the instant invention, and by this reference incorporated herein. Circuit interrupter 400 has an actuating coil L which when it receives a current through it opens normally closed contacts 51, 52 to open circuit conductors 110,120. A parallel network of $R_2C$, and D biasis the gate of the SCR to prevent false operations. When the current to the gate of the SCR is raised above the bias level, the SCR conducts and circuit interrupter 400 is operated by current flowing through coil L. The device depicted in the '853 patent is termed an immersion detection circuit interrupter mechanism because it opens the conductors supplying power to an appliance if the appliance is immersed in a liquid.

It will be appreciated that variations and alterations to the disclosed embodiment of the invention can be made without departing from the spirit and scope of the invention.

What is claimed is:

1. A fiber optical monitoring system for electrical cables, conductors and the like comprising:
   an electrical apparatus comprising a plurality of electrical conductors;
   an optical fiber whose light transmission characteristics are affected by changes in temperature about the fiber or by the direct application of stress to such fiber situated in such close proximity to said plurality of electrical conductors that the amount of light passing through said optical fiber is affected by temperature changes of said plurality of conductors;
   a light source at a first end of said optical fiber;
   means for detecting light and producing an electrical output signal proportional to the level of detected light, said means for detecting light being located at a second end of said optical fiber opposite said first end; and
   means responsive to said electrical output signal to open circuit said plurality of conductors when said electrical output signal reaches a present level.

2. The fiber optical monitoring system of claim 1, wherein said electrical apparatus is an extension cord comprising a cable having a plug end and a receptacle end with said plurality of conductors running from said plug end to said receptacle end.

3. The fiber optic system of claim 1, wherein said means responsive to said electrical output signal to open circuit said plurality of conductors comprises a signal level detector for producing an electrical operating signal in response to certain of said electrical output signals and a circuit interrupter mechanism which is connected to said signal level detector and responsive to said electrical operating signal to open circuit said plurality of conductors.

4. The fiber optical system of claim 1, wherein said signal level detector also is connected to a present electrical reference signal to produce an electrical operating signal whenever said electrical output signal level is lower than the level of said present electrical reference signal and said means responsive to said electrical operating signal to open circuit said plurality of conductors comprises a protective relay having an operating coil connected to said signal level detector to receive said electrical operating signal and said protective relay further having movable contact means responsive to the receipt by said operating coil of an electrical operating signal to move said movable contact means to an open position to open circuit said plurality of conductors.

5. The fiber optical system of claim 2, wherein said means responsive to said electrical output signal to open circuit said plurality of conductors comprises a signal level detector connected to said means for detecting light and responsive to electrical output signals to produce electrical operating signals and an immersion detection circuit interrupter mechanism which is connected to said signal level detector and responsive to electrical operating signals to operate to open circuit said plurality of conductors.

6. The fiber optical system of claim 2, wherein said signal level detector also is connected to a preset electrical reference signal to produce an electrical operating signal whenever said electrical output signal level is lower than the level of said present electrical reference signal and said means responsive to said electrical operating signal to open circuit said plurality of conductors comprises a protective relay having an operating coil connected to said signal level detector to receive said electrical output signal and said protective relay further having movable contact means responsive to the receipt by said operating coil of an electrical output signal to move said movable contact means to an open position to open circuit said plurality of conductors.

7. The system of claim 1, wherein said means responsive to said electrical output signal to open circuit said plurality of conductors is resettable to reclose said open circuited plurality of conductors.

8. The fiber optical system of claim 1 wherein said light source is a light emitting diode.

9. The fiber optical system of claim 1 wherein said means for detecting light is a photodiode.

10. The fiber optical system of claim 1 wherein said means for detecting light is a phototransistor.

11. The fiber optical system of claim 1, wherein said optical fiber comprises a core and cladding surrounding said core, said core and said cladding each having an index of refraction which varies with temperature, said optical fiber core and cladding being selected such that the difference between their respective indices of refraction varies with temperature, at least over a predetermined temperature range, and such that the amount of light passing through said optical fiber varies with changes in said difference.

12. The fiber optical system of claim 1, wherein said optical fiber comprises a core and cladding surrounding said core, said core and said cladding each having an index of refraction which varies with the stress applied to said optical fiber, said optical fiber core and cladding being selected such that the difference between their respective indices of refraction varies with the applies stress, at least over a predetermined stress range, and such that the amount of light passing through said optical fiber varies with changes in said difference.

13. The system of claim 4, wherein said means responsive to of said electrical operating signal comprises a solid state relay.

* * * * *